United States Patent
Parker et al.

(10) Patent No.: US 10,708,155 B2
(45) Date of Patent: Jul. 7, 2020

(54) SYSTEMS AND METHODS FOR MANAGING NETWORK OPERATIONS

(71) Applicant: GUAVUS, INC., San Mateo, CA (US)

(72) Inventors: Benjamin James Parker, Reno, NV (US); Gabriele Dipiazza, Los Gatos, CA (US); Anukool Lakhina, Foster City, CA (US); Jin He, San Ramon, CA (US)

(73) Assignee: GUAVUS, INC., San Jose, CA (US)

( * ) Notice: Subject to any disclaimer, the term of this patent is extended or adjusted under 35 U.S.C. 154(b) by 9 days.

(21) Appl. No.: 15/172,601

(22) Filed: Jun. 3, 2016

(65) Prior Publication Data

US 2017/0353363 A1    Dec. 7, 2017

(51) Int. Cl.
*H04L 12/24*     (2006.01)
*H04L 12/26*     (2006.01)

(52) U.S. Cl.
CPC ............ *H04L 43/065* (2013.01); *H04L 41/12* (2013.01); *H04L 43/08* (2013.01); *H04L 41/0631* (2013.01); *H04L 43/022* (2013.01); *H04L 43/16* (2013.01)

(58) Field of Classification Search
CPC ... H04L 41/5035; H04L 41/16; H04L 43/022; H04L 41/06
See application file for complete search history.

(56) References Cited

U.S. PATENT DOCUMENTS

| | | | |
|---|---|---|---|
| 6,609,083 B2 | 8/2003 | Enck et al. | |
| 6,917,845 B2 | 7/2005 | Hsiung et al. | |
| 7,739,211 B2 | 6/2010 | Coffman et al. | |
| 7,970,934 B1 | 6/2011 | Patel | |
| 8,935,389 B2 | 1/2015 | Pedigo et al. | |
| 2006/0020924 A1 | 1/2006 | Lo et al. | |
| 2012/0124307 A1 | 5/2012 | Ashutosh et al. | |
| 2012/0330549 A1* | 12/2012 | Dannevik | G01W 1/00 702/3 |
| 2015/0135312 A1* | 5/2015 | Wada | G06F 11/3495 726/22 |
| 2015/0347628 A1* | 12/2015 | Krajec | G06F 3/0482 707/756 |
| 2016/0134503 A1* | 5/2016 | Watson | H04L 43/026 709/224 |
| 2016/0359592 A1* | 12/2016 | Kulshreshtha | H04L 63/1425 |
| 2017/0124642 A1* | 5/2017 | Barnett | G06Q 40/02 |

* cited by examiner

*Primary Examiner* — Michael A Keller
(74) *Attorney, Agent, or Firm* — Kerr IP Group, KKC

(57) ABSTRACT

Systems and methods for managing network operations are described. An illustrative system includes a plurality of network components, in which each network component generates a plurality of network component data, and a mediation node that receives the plurality of network component data. The mediation node associates a plurality of time series data and a network topology with the network component data. The mediation node includes at least one baseline module that receives a selected subset of the network component data and generates at least one baseline for anomaly detection. The system may further include at least one application component communicatively coupled to the mediation node, and the application component may receive the time series data, the plurality of subsets of the network component data, and a plurality of baselines and identify a relationship.

28 Claims, 10 Drawing Sheets

SYSTEMS AND METHODS FOR MANAGING NETWORK OPERATIONS

FIELD

The present disclosure relates to computer network analysis, and more particularly to systems and methods for managing network operations.

BACKGROUND

The correct operation of computer networks depends upon the ability of the network to reliably, and consistently, transfer data across the network. A variety of network tools have therefore been developed to ensure network reliability. For example, many conventional networks are equipped with network probes. A network probe is a network traffic monitor and protocol analyzer that provides an instant picture of the network traffic situation by displaying detailed information about the type and amount of network traffic, which helps identify existing or potential problems in a network.

Although network probes are typically quite accurate, implementation often requires placement of a large number of probes across all or a portion of the network. As a result, probe-based network monitoring may require the placement of a large number of probes, which may increase the cost associated with network monitoring operations. In addition, physical probes may experience difficulty collecting and filtering the entire data stream, particularly where the data stream includes a large number of data packets.

Improved systems and methods for monitoring large-scale networks in real time are therefore desirable. In particular, systems and methods for monitoring and managing network operations in real-time without the necessity and expense of probe installation and maintenance are desirable.

SUMMARY

Systems and methods for managing network operations are described. An illustrative system includes a plurality of network components, in which each network component generates a plurality of network component data. Additionally, the illustrative system includes a mediation node that receives the network component data. In the illustrative embodiment, the mediation node associates a plurality of time series data and a network topology with the network component data. The illustrative mediation node includes at least one baseline module that receives a selected subset of the network component data and generates at least one baseline for anomaly detection. The system also includes at least one application component communicatively coupled to the mediation node. The illustrative application component identifies a relationship between the time series data, the subsets of the network component data, and at least one baseline.

An illustrative system may further include a plurality of local mediation nodes, in which each local mediation node receives network component data. The local mediation nodes may associate time series data and a network topology with the network component data. A central mediation node that is communicatively coupled to the plurality of local mediation nodes may include a baseline module, which generates at least one baseline for anomaly detection. The system may further include at least one application component communicatively coupled to the central mediation node, wherein the application component identifies a relationship between the time series data, the subsets of the network component data, and at least one baseline.

An illustrative method may include receiving a plurality of network component data from each network component at a mediation node, and associating a plurality of time series data and a network topology with the network component data. The mediation node may further select at least one subset of the plurality of network component data, and generate least one baseline from the subset of the network component data with a baseline module. An application component may then proceed to receive the time series data, the plurality of subsets of the network component data and a plurality of baselines and identify a relationship.

FIGURES

This disclosure will be more fully understood by reference to the following drawings which are presented for illustrative, not limiting, purposes.

DESCRIPTION

Figure 1:
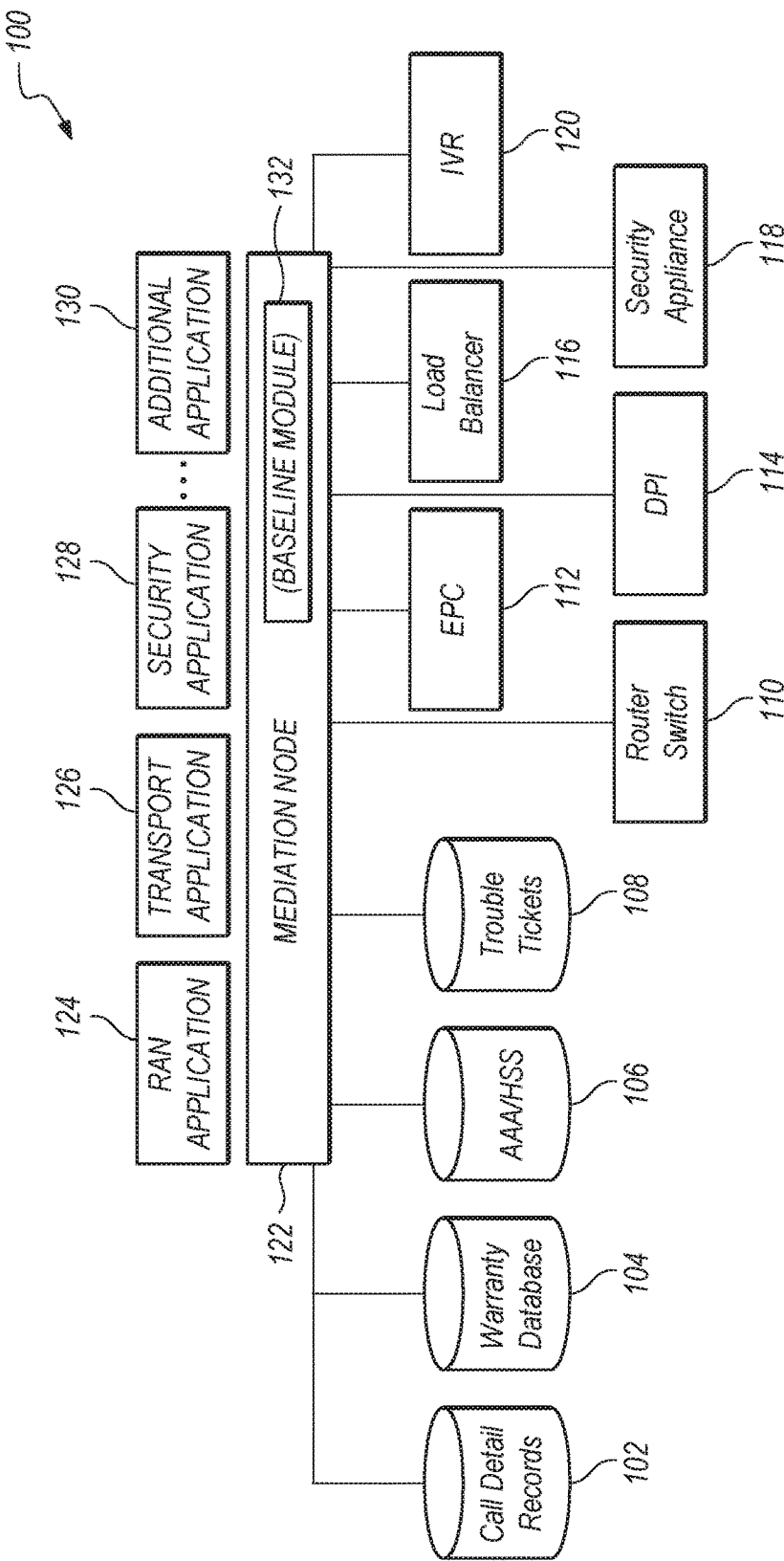
FIG. 1 shows an illustrative block diagram of a system for managing network operations as described herein and in accordance with various embodiments.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims. It is further understood that the steps described with respect to the disclosed process(es) may be performed in any order and are not limited to the order presented herein.

As used herein, a network "node" or "network component" may include any component on a computer network, such as client computer, a server computer, a processor, a router, a switch, a radio (e.g., elements of LTE radio access networks, such as eNodeBs, base stations, and the like), a mobile phone, a wireless device, an application, a gateway, a mobility management element, a firewall, a load balancer, a virtual machine, an element management system, and the like.

As used herein, a network "data link" may include any path between two nodes or network components on the network. A data link may include a plurality of interceding nodes or network components, such that a data packet transmitted from node A to node D may pass from node A, to node B, to node C, to node D. Nodes or network components may be interconnected by one or more wires (e.g., twisted pair wire or cable, optical fiber cable, etc.) or wirelessly (e.g., by way of a WiFi connection, a BLUETOOTH connection, a cellular connection, etc.)

As used herein, "network data" or "network component data" includes, but is not limited to, SNMP, logs, element management data, sessions, data flows, data packets, data frames, and other data generated by or associated with each network component, network node, or data link. Additionally, network component data can be generated by any network component or network node, such as by trouble ticketing systems, management and orchestration systems, maintenance systems, data warehouses, billing systems, data lakes, element management systems, ticketing systems, interactive voice response systems, call detail record systems, warranting tracking systems, various databases, and other such customer platforms.

As used herein, a "data source" may include any source of data which may enable network analysis, as described herein. A data source may include a network component or data link, as described above. A data source may further generate network component data. For example, a data source may include any of the data sources shown in Table 1 below.

TABLE 1

| Route IQ Base Data | Session Data | Driver/ Interface Data | BFD Link Data | Host Server Data |
|---|---|---|---|---|
| Authority | Session Count | Hardware Queue Drops | Link Latency | CPU |
| Tenant | Incomplete Session Count | Error Counts | Round Trip Time (RTT) | Memory |
| Fabric | Session Length/ Duration | Packets Transmitted | Jitter | Per Processor Kernel Usage |
| Service | Forward Packet Count | Throughput | Path MTU | File System I/O |

TABLE 1-continued

| Route IQ Base Data | Session Data | Driver/ Interface Data | BFD Link Data | Host Server Data |
|---|---|---|---|---|
| Service Agent Node (SLICE or CORE) | Backward Packet Count Forward Data Transmitted | | Available Bandwidth | Temperature Active Processes |
| Device Interface | Backward Data Transmitted | | | |
| Session Type (Service Class, Protocol, Port) | Forward Payload | | | |
| Traffic Priority | Backward Payload | | | |
| Service Scope (Public/ Private) | Bad Termination Ratio | | | |
| Service Group | Re-transmission Ratio | | | |
| Software Version | TCP First Packet Delay TLS Setup Time TCP Idle Time | | | |

As used herein, a "network topology" is the pattern in which network components or nodes are connected to a local area network (LAN) or other network via one or more data links. There are four principal topologies used in LANs: bus, ring, star and mesh. The most widely used of these is bus, because it is employed by Ethernet, which is the dominant LAN architecture. In a bus topology all devices are connected to a central cable, called the bus or backbone. This topology is relatively inexpensive and easy to install for small networks.

As used herein, a "baseline" or "baseline value" may be associated with data and may include a standard or normal value associated with the data, such as an average value of the data over a period of time, a value of the data as defined by an operational specification for a network component associated with the data, and the like.

As used herein, a "continuous baseline" may be a baseline that is generated on a periodic basis for a particular data or set of data. An example of continuously baselined data is shown at Table 2 below.

TABLE 2

| Session Data | Host Server Data | Driver/ Interface Data | BFD Link Data |
|---|---|---|---|
| Session Count | CPU | Hardware Queue Drops | Link Latency |
| Incomplete Session Count | Memory | Error Counts | Round Trip Time (RTT) |
| Session Length/Duration | Per Processor Kernel Usage | Packets Transmitted | Jitter |
| Forward Packet Count | Kernel Usage | Throughput | Path MTU |
| Backward Packet Count | File System I/O | | Available Bandwidth |
| Forward Data Transmitted | Temperature | | |

TABLE 2-continued

| Session Data | Host Server Data | Driver/ Interface Data | BFD Link Data |
|---|---|---|---|
| Backward Data Transmitted | Active Processes | | |
| Forward Payload | | | |
| Backward Payload | | | |
| Bad Termination Ratio | | | |
| Retransmission Ratio | | | |
| TCP First Packet Delay | | | |
| TLS Setup Time | | | |
| TCP Idle Time | | | |

As used herein, a "service impacting event" (SIE) may include any deviation in data from a baseline value for a data. An SIE may impact or affect a computer network, such as, for example, in terms of network latency, packet loss over the network, network node availability, network data processing capability, and the like.

As used herein, a "session" may include network traffic generated by a particular network user or network subscriber, such as, for example, a university or a corporation.

As used herein, a "key performance indicator" (KPI) may include any network data which may be of particular interest to a user. A KPI may be selected, or marked, as a KPI by a user via a user interface. A KPI may be displayed in association with a node or in association with a session, as described in greater detail below.

Systems and methods for managing network operations are disclosed and described below. In general, the systems and methods described herein reduce or eliminate the utilization of physical network probes within a network. Rather, the disclosed systems and methods collect data from a plurality of network components and monitor the health and reliability of the network based upon the collected data.

More particularly, network component data may be collected by one or more mediation nodes. The mediation nodes may analyze the data collected in association with the one or more network components to generate baseline data for each of the network components. The baseline data may indicate an average or normal data value or set of data values for each of the network components.

Each of the baseline values may be supplied to one or more application components, each of which may reside, in the network topology, at an application layer. The application components may store the received baseline data and may receive, during network operation, a plurality of time series network component data. The application components may compare the received time series data to the baseline data for one or more network components to determine whether the network components are operating within a normal range (e.g., close to the baseline value for the particular network component). If an application component determines that a network component is operating outside of a baseline range, the application component may generate an alarm for review and analysis by a user.

The application components may further combine (or "fuse") baseline data generated for a plurality of network components based upon the interrelationships, or interconnections, between those components. For example, a baseline temperature computer processor may be combined with or connected to a baseline measurement for the network bandwidth, and if either baseline varies or deviates beyond a threshold value, an alarm condition may be generated for either or both of the interconnected network components. A cause and effect matrix (e.g., a matrix connecting a processor temperature to a network bandwidth) may therefore be generated.

As a further example, an application component may observe that packet loss exceeds a baseline value on a virtual router. An application component may analyze the baseline data that it has received to identify that a particular processor on the network is running at 99% of its maximum processing capability and that the temperature of a server on the network is simultaneously 60 degrees warmer than its baseline temperature. The application component may determine, based upon these factors, that the cause (or root cause) of the observed packet loss is due to the processor utilization and server temperature.

As another example, an application component may determine that a large number of servers in a data center on the network are concurrently running at temperatures in excess of their associated baseline temperatures. In response, the application component may generate an alarm, which may direct a technician in the data center to validate, or check, the ambient air temperature in the data center. The application component may also check for the occurrence of a maintenance event, such as a firmware upgrade in the datacenter, which was conducted in the same timeframe, and applied to the servers exceeding their baseline temperatures.

In various embodiments, domain knowledge may be used to determine a plurality of KPIs within a network. A user may also supply KPIs. KPIs may, as described above, include network component data (or other data) that is of particular importance to a particular network user. An application component may therefore analyze the baselines associated with specified KPIs to determine if one of the KPIs is trending out of the normal baseline or has exceeded a preset level that is considered an alarm condition (e.g. packet loss exceeds 0.001%). When a condition is met that violates a KPI or indicates a trend towards a violation, the application component may request time series data from one or more mediation nodes that also deviated from baseline within the same or a similar timeframe. The application may thus identify the cause and effect associated with observed condition. The application may also map the deviations in the baseline to the KPIs to generate a cause and effect matrix. This cause and effect analysis may reduce the number of false alarms, because unrelated events in the network may not trigger, in the cause and effect matrix, an alarm condition.

An alarm may be contextualized to determine the severity of the network event associated with the alarm. For instance, a subscriber (or session) identity may be associated with a plurality or subset of time series data to contextualize an alarm generated for the subscriber (or a plurality of subscribers) based upon received time series data. Time series data may be further contextualized with billing system data to quantify a potential financial impact of an alarm condition or event. Factors such as these may be used to prioritize a plurality of generated alarms. For example, alarms may be prioritized based upon an alarm gradient, a number of customers or subscribers impacted, and monetary opportunity cost of the event triggering the alarm.

A plurality of alarms caused by a single event may be further reduced to a single alarm or alarm condition, and the prioritization of such alarms, based on business impact, may provide customers with critical insights into reducing the mean time to resolution of events. Prioritization may also ensure that the most critical events are handled in a prioritized fashion.

A network application may further evaluate a sequence of events that preceded an alarm condition. Over time, the application component may identify, based upon this evaluation, similarities between various network component baselines that occurred prior to the generation of an alarm condition. For example, when an alarm condition occurs, an application component may analyze a plurality of baselines contributing to the generation of the alarm condition. More particularly, an application component may identify a plurality of baseline deviations occurring close in time to an alarm condition. These baseline deviations may, together, form an "alarm signature," or a plurality of deviations from various baselines that, together, may signal a particular network event or outage. These alarm signatures may be considered early warning indicators of network outages or issues. Alarm signatures may be used to preemptively identify various outage events as well as to prioritize maintenance activities in order to avoid the occurrence of impending outages. Further, over time, as additional data is collected and analyzed, alarm signatures may be improved and refined.

The systems and methods described herein may therefore enable network operations management based upon the analysis of network component data. Importantly, a plurality of mediation nodes (disposed at an intermediate layer of the network topology) may eliminate or reduce reliance on physical network probes for data collection.

With reference now to FIG. 1, there is shown a system 100 for managing network operations. As shown, the system 100 may include a plurality of network components 102, 104, 106, 108, 110, 112, 114, 116, 118, and 120. The system 100 may further include a mediation node 122 and a plurality of application components 124, 126, 128, and 130. The mediation node 122 may include a baseline module 132.

As described herein, the network components, or nodes, may include any network node or component capable of generating network data (e.g., any data source). For example, and as shown, the network component 102 may include a database containing call detail records, the network component 104 may include a database containing warranty information, the network component 106 may include a database containing authentication, authorization, and accounting and home subscriber services (AAA/HSS) data, and the network component 108 may include a database containing trouble tickets. By way of example and not of limitation, the network component 110 may include a router switch. Additionally, the network component 112 may include an evolved packet core (EPC). Furthermore, the network component 114 may include a deep packet inspection element (DPI). Further still, the network component 116 may include a load balancer; the network component 118 may include a security appliance. Further yet, the network component 120 may include an interactive voice response system (IVR).

The mediation node 122 may include a server computer capable of receiving data from the network components 102-120 and performing various data processing and analysis functions as described herein. The mediation node 122 may include a high performance data record collector, analyzer, and router. The mediation node 122 may be communicatively coupled, e.g., via a data link, to the plurality of network components 102-120.

The baseline module 132 may include software or hardware running on the mediation node 122. For example, the baseline module 132 may include a software module or set of software modules that are stored in a memory of the mediation node 122 and executed by a processor of the mediation node 122 to perform operations as described herein.

Each of the plurality of application components 124, 126, 128, and 130 may include any suitable software application. The application components 124-130 may be configured to run on any computing platform, such as a server computer or client computer. For example, the application components 124-130 may run on the mediation node 122, or the application components 124-130 may run on one or more client computers (or client nodes) that are communicatively coupled to the mediation node 122.

Figure 2:
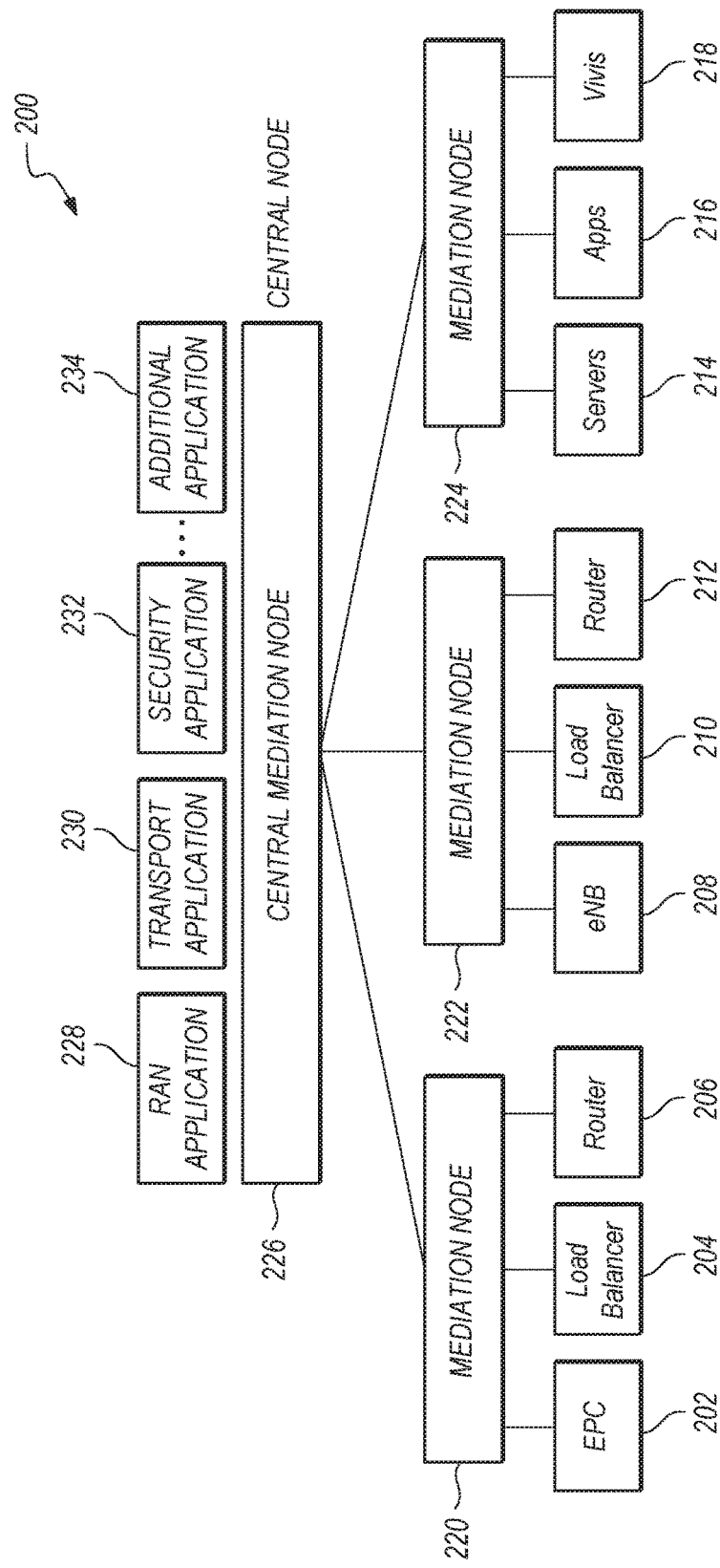
FIG. 2 shows an illustrative block diagram of a geographically distributed system for managing network operations as described herein and in accordance with various embodiments.

With reference to FIG. 2, there is shown a geographically distributed system 200 for managing network operations. Like the system 100, the system 200 may include a plurality of network components 202, 204, 206, 208, 210, 212, 214, 216, 218. The system 200 may further include a plurality of mediation nodes 220, 222, and 224, a central mediation node 226, and one or more application components, such as application components 228, 230, 232, and 234.

The network components 202-218 may include data sources, and each network component 202-218 may reside at a geographically distributed location, or the network components 202-218 may reside in a geographically distributed group of network components. For instance, the network components 202-206 may reside at a first geographic location, the network components 208-212 may reside at a second geographic location, and the network components 214-218 may reside at a third geographic location.

The network components 202-218 may be communicatively coupled, via a plurality of data links, to one or more mediation nodes, such as mediation nodes 220, 222, and 224. For example, the network components 202-206 may be coupled to the mediation node 220, the network components 208-212 may be coupled to the mediation node 222, and the network components 214-218 may be coupled to the mediation node 224. Each of the mediation nodes 220-224 may receive data from the network components 208-212 and may include a high performance data record collector, analyzer, and router as described above. Each of the mediation nodes 220-224 may further include a baseline module as described above with respect to the mediation node 122.

The mediation nodes 220-224 may be communicatively coupled to a central mediation node 226, which may collect, organize, and compile data provided by each of the mediation nodes 220-224. The central mediation node 226 may therefore include a high performance data record collector, analyzer, and router. The central mediation node 226 may further include a baseline module as described above with respect to the mediation node 122.

Each of the plurality of application components 228, 230, 232, and 234 may include any suitable software application. The application components 228-234 may be configured to run on any computing platform, such as a server computer or client computer. For example, the application components 228-234 may run on the central mediation node 226, or the application components 228-234 may run on one or more client computers (or client nodes) that are communicatively coupled to the central mediation node 226.

Figure 3:
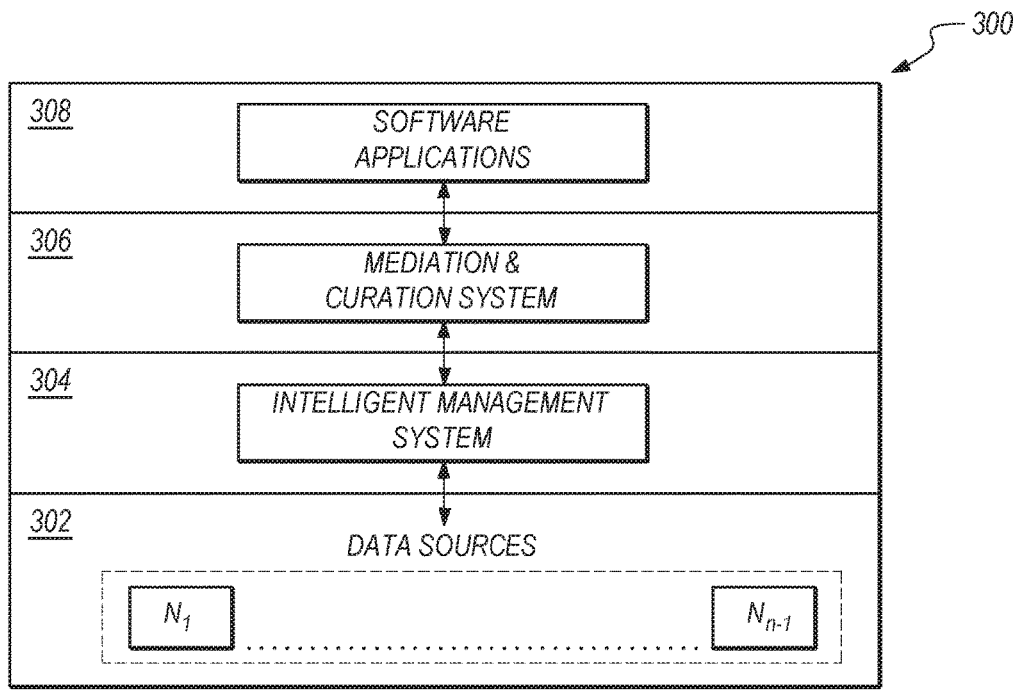
FIG. 3 shows an illustrative network model characterizing the communications functions a system for managing network operations as described herein and in accordance with various embodiments.

With reference to FIG. 3, there is shown an illustrative network model 300 characterizing the system 100 or the system 200. The network model 300 is logically divided into four layers 302, 304, 306, and 308.

Each of the layers 302-308 may correspond to a component of the network topologies described above with respect to FIGS. 1 and 2. For example, a plurality of network components (i.e., data sources) may logically reside at the layer 302. These network components may include network components 102-120 or 202-218. Likewise, one or more mediation nodes (e.g., nodes 122 or 220-224) may logically reside at the network layer 304. The central mediation node 226, described with respect to FIG. 2, may logically reside at the layer 306, and a plurality of software applications or application components (e.g., application components 124-130 or application components 228-234) may logically reside at the topmost layer 308.

Figure 4:
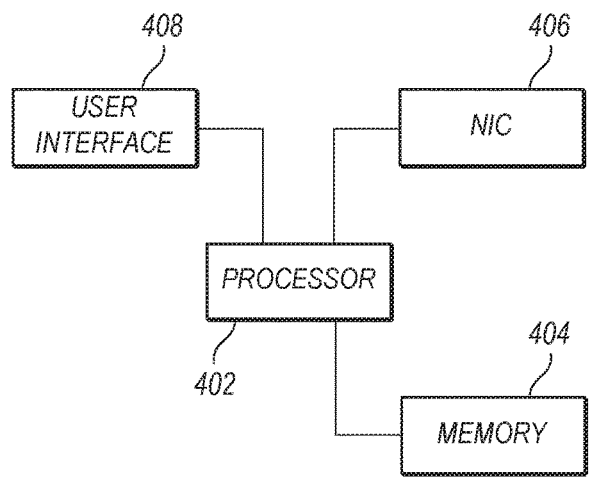
FIG. 4 shows an illustrative block diagram of a mediation node as described herein and in accordance with various embodiments.

With reference to FIG. 4, there is shown an example system block diagram of a mediation node, such as any of the mediation nodes 122, 220, 222, 224, or the central mediation node 226. The mediation nodes may thus include a processor 402, a memory 404, a network interface card (NIC) 406, and a user interface 408.

The processor 402 may include any computer processor or plurality of computer processors, such as a processing core including a plurality of processors. The memory 404 may include any non-transitory, tangible, computer-readable storage medium. The memory 404 may store computer-readable program instructions which may be executed by the processor 404 to perform the network management operations described herein. The memory 404 may be communicatively coupled, such as by a data link or plurality of data links, to the processor 402.

The NIC 406 may include any network interface card or network interface component configured to permit communications between a mediation node (e.g., the processor 402) and another network component. The NIC 406 may be communicatively coupled, such as by a data link, to the processor 402.

The user interface 408 may include any interface through which a user (e.g., a subscriber, a customer, and the like) may access or interface with the systems 100 or 200. For example, the user interface 408 may include a display, such as a computer display, a tablet display, a smartphone display, and the like. The user interface 408 may be communicatively coupled to the processor 402, such as by a data link.

Figure 5:
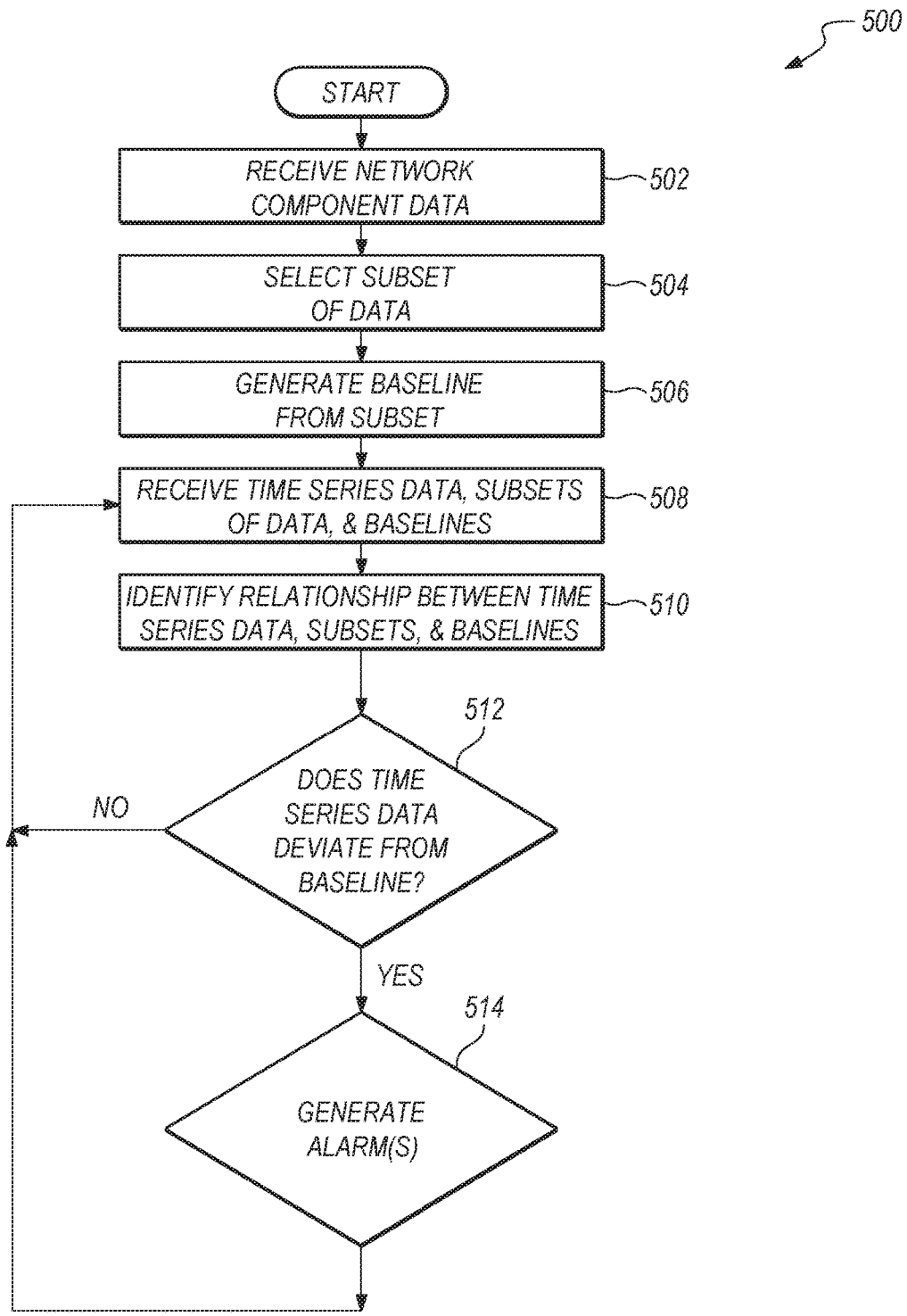
FIG. 5 shows an illustrative flowchart of a process for managing network operations as described herein an in accordance with various embodiments.

With reference to FIG. 5, there is shown a flowchart describing a process 500 for network management operations. As shown, at block 502, any of the mediation nodes described herein may receive network component data from a network component, such as any of the network components 102-120 or 202-218. Network component data may be received from any of the data sources described herein as well as, in various embodiments, any other network component that may reside on the network. The mediation node receiving the network component data may associate a plurality of time series data and a network topology with the receive network component data.

Figure 6:
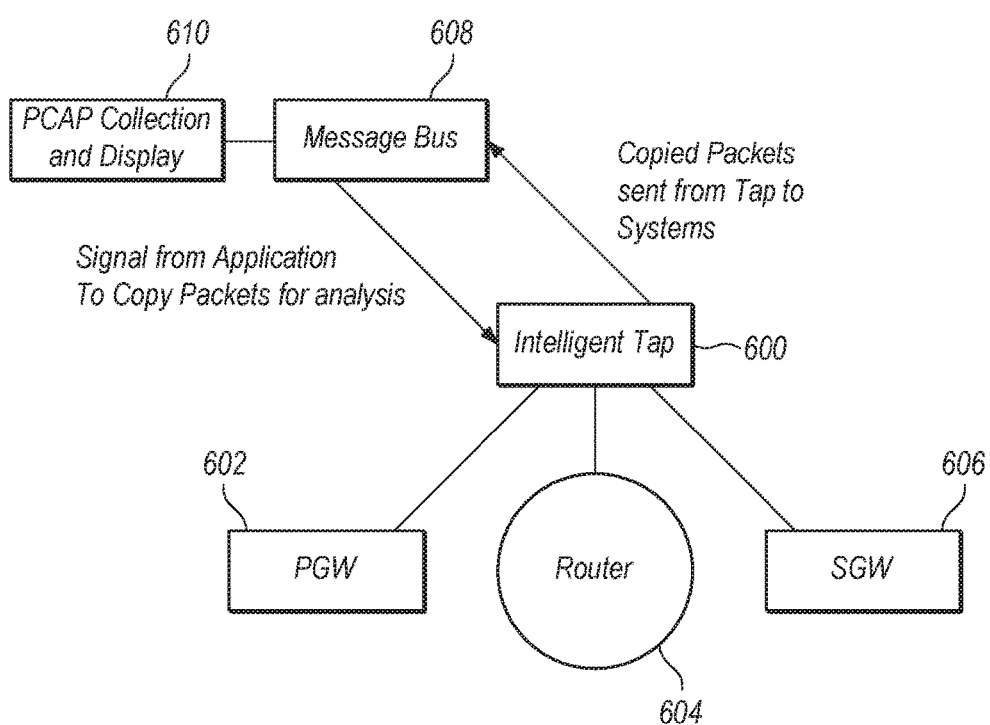
FIG. 6 shows an illustrative intelligent data tap as described herein and in accordance with various embodiments.

As described above, network component data may be collected, during operation, by the one or more mediation nodes 122 and/or 220-226. However, network component data may be collected, in various embodiments, by an intelligent network tap. An example intelligent network tap 600 is shown at FIG. 6. The intelligent tap 600 may be communicatively (as well as physically) between one or more network components, such as network components 602, 604, and 606, and a message bus 608. The message bus 608 may include a data link that transfers network component data collected by the intelligent tap 600 to a mediation node for processing.

An intelligent tap 600 may therefore include a hardware device coupled between a plurality of network components and one or more mediation nodes. To this end, the network tap 600 may include at least three ports, a first port, a second port, and a monitor port. Network component data may pass into the first port and out of the second port of the network tap 600 on its way across the network. All (or a selected portion) of the data passing between the first port and the second port may be copied by the network tap 600 to the monitor port. The data copied to the monitor port may be filtered, such as based upon VLAN ID, application, or other parameters, such that only the filtered data is communicated to a mediation node for analysis. Thus, an intelligent network tap 600 may collect and filter network component data prior to passage of the data to one or more mediation nodes.

In various embodiments, a packet capture (PCAP) component 610 (e.g., a PCAP collection and display node) may be provided between the message bus 608 and one or more mediation nodes. The PCAP component 610 may include an application programming interface (API) for capturing or displaying network traffic collected and filtered by the network tap 600. In particular, the PCAP component 610 may transmit a control message to the intelligent tap 600, which the intelligent tap 600 may use to determine which data packets to collect or filter.

With returning reference to FIG. 5, at block 504, the mediation node receiving the network component data may select a subset of the plurality of received network component data. The mediation node may select the subset of the network component data based upon any suitable data selection criteria, such as, for example, based upon a user input, a data selection schedule, and the like.

At block 506, the mediation node receiving the network component data may generate at least one baseline for anomaly detection from the subset of the network component data. More particularly, a baseline module, such as the baseline module 132, may generate at least one baseline from the subset of the network component data. For instance, where the subset of network component data includes a processor temperature, the baseline module 132 may generate a baseline processor temperature, which may represent an average or median processor temperature, a normal processor temperature, and the like. Similarly, where the subset of network component data includes an available bandwidth, the mediation node 132 may generate a baseline bandwidth value, which may represent an average or median bandwidth, a normal bandwidth, and the like.

The network component data and the subset of network component data may be selected, in various embodiments, according to one or more KPIs, as described above. For example, where a KPI includes network latency, the subset of network component data that is selected may be data that may be used to calculate or otherwise determine the network latency as well as to determine a baseline network latency. Thus, a KPI, which a user may set or select, may be used to determine which network data is selected for evaluation or analysis.

At block 508, at least one application component (such as any of the application components 124-130 or 228-234) may receive the time series data, the plurality of subsets of the network component data, and the plurality of baselines. Further, at block 510, any of the application components may identify a relationship between the time series data, the plurality of subsets of the network component data, and the plurality of baselines.

More particularly, at decision diamond 510, at least one application component may determine whether any of the time series data deviates from a baseline. For instance, the time series data, which may include time series data generated by or associated with a particular network component, may be compared to a baseline associated with the network component, and if the comparison indicates that the network component data is deviating from the baseline for the component, the application component making the comparison may determine that a violation or alarm condition has occurred.

An application component may further generate a cause and effect matrix. A cause and effect matrix may be generated based upon a plurality of baseline data. For example, an application component may analyze a plurality of baseline data to determine baseline data that varies (or tends to vary) simultaneously or within a particular period of time. The application component may generate or infer a relationship or interconnection between baseline data (such as baseline data associated with a first network component and baseline data associated with a second network component) that varies within such a time period. The relationship may be stored as part of a cause an effect matrix, which may reflect the association or interconnection between a first baseline (the "cause") and a second baseline (e.g., the "effect").

An application component may perform a predictive analysis based upon the cause and effect matrix. For example, an application component may monitor incoming time series data, compare the incoming data to data in the cause and effect matrix, and where a deviation occurs in the incoming time series data, the application component may check the cause and effect matrix for a relationship between the deviating incoming data and another dataset. If such a relationship exists, the application component may predict or forecast a deviation in the associated dataset (or application component associated with the dataset). Thus, the application component may generate an early warning for a deviation from a baseline for a particular network component based upon deviation from baseline in another, associated, network component.

The baseline data including the cause and effect matrix may further act as an alarm signature. That is, the relationships defined in the cause and effect matrix between a plurality of network components may define an alarm signature in that where at least one of the baselines between the interconnected components deviates, an application component may infer that the other components are also likely to deviate from their baselines.

The application component making the comparison may, in addition, and in response to determining that a violation or alarm condition has occurred, generate an indication that the violation or alarm condition has occurred. The application component may indicate a violation or alarm condition with (or without) triggering an alarm. For example, as shown at decision diamond 512, the application component may trigger an alarm. The application component may further determine not to generate an alarm based upon the cause and effect matrix. For instance, where incoming time series data shows a deviation from baseline for a network component, the application component may check the alarm signature associated with the network component, and if other incoming deviations occur in unrelated network components, the application component may determine not to generate an alarm.

In various embodiments, the application component making the comparison may further indicate a violation without triggering an alarm in response to determining that the data associated with the network component has deviated away from an associated baseline value, but that the deviation does not surpass a threshold value. However, where the application component determines that the data associated with the network component has deviated away from the baseline value by at least a threshold value, the application component may, as shown at decision diamond 514, generate or trigger at least one alarm. Both the violation and the alarm may be presented to the user, e.g., by way of the user interface 408.

An application component generating a plurality of alarms may further prioritize each alarm. Alarms may be prioritized based upon, for example, a preference indicator, which may be set by a user. A preference indicator may include at least one of a service value, a financial value, a severity, a revenue impact, and a subscriber (or user) impact.

An application component may further reduce a plurality of alarms to a single alarm (or to a fewer number of alarms) based upon a relationship between the alarms. For example, where a plurality of alarms are generated based upon baseline deviations in incoming time series data, the application component may check the cause and effect matrix, and if there is an alarm signature associated with the incoming time series data, the application component may recognize that a single alarm may be generated for the collection of related network components rather than for each network component individually.

Figure 7:
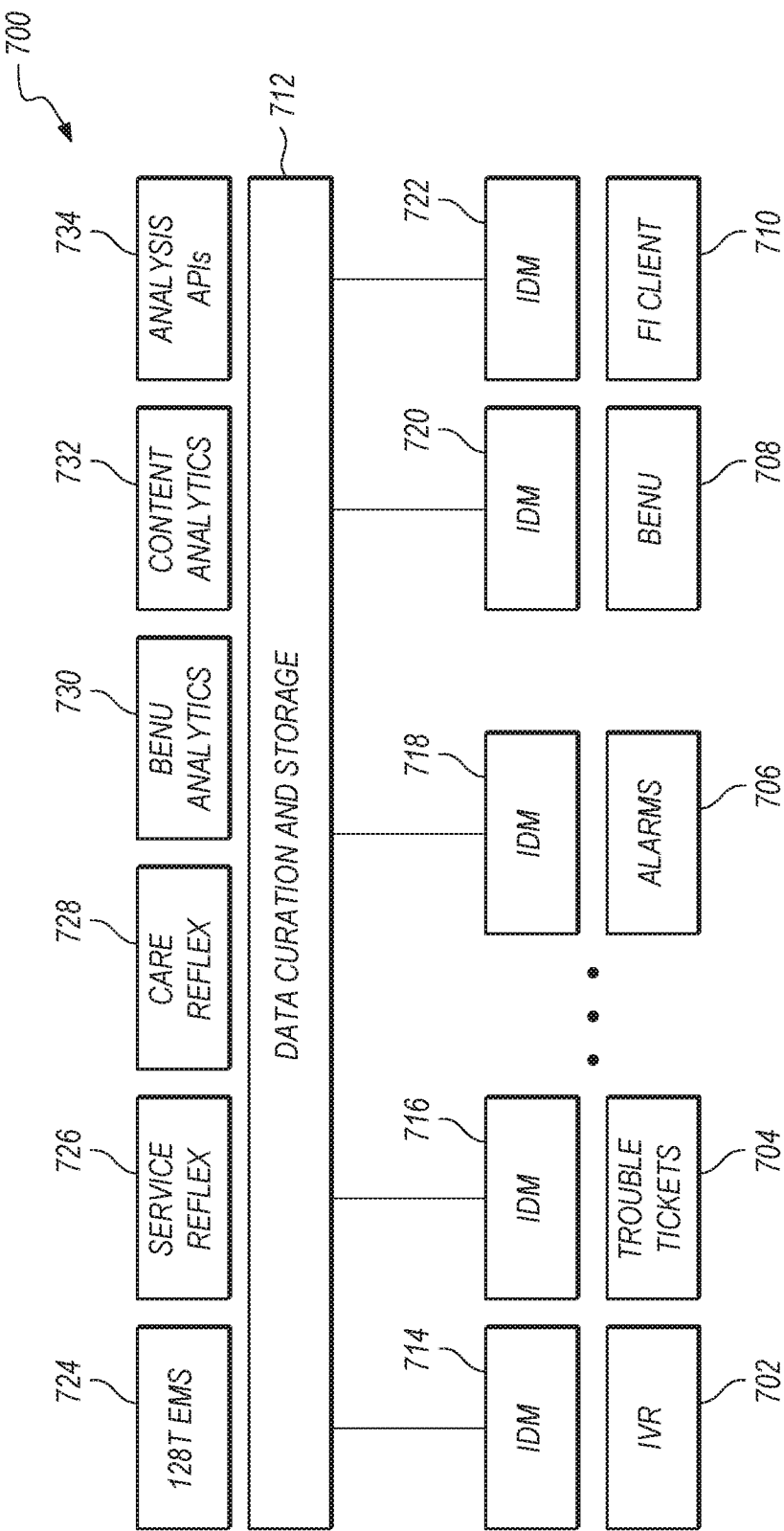
FIG. 7 shows an illustrative block diagram of an embodiment of a system for managing network operations as described herein and in accordance with an illustrative embodiment.

With reference to FIG. 7, there is shown an illustrative block diagram of an embodiment of a system 700 for managing network operations. As described above with reference to FIGS. 1-6, the system 700 may include a plurality of network components 702, 704, 706, 708, and 710. The mediation node 712 may receive, collect, and analyze data packets transmitted by each of the network components 702-710. However, in various embodiments, a plurality of intelligent taps 714, 716, 718, 720, and 722 may intercept data packets transmitted by each of the network components 702-710, and may, as described above, filter and pass all or a subset of the received data packets to the mediation node 712. The intelligent taps 714, 716, 718, 720, and 722 may be excluded from the system 700, however, because the mediation node 712 may, as described herein, perform the function traditionally performed by the plurality of network taps 714, 716, 718, 720, and 722.

The mediation node 712 may, as described above, analyze the received data packets to generate a plurality of baselines for a plurality of network components or network component data. The mediation node 712 may provide each of the plurality of baselines to each of a plurality of application components 724, 726, 728, 730, 732, and 734.

As time series data is received by the mediation node 712 from each of the network components 702-710, the mediation node 712 may route the time series data, as appropriate, to each of the application components 724-734. The application components 724-734 may, in turn, compare the received time series data to the baselines associated with each network component 702-710 to generate one or more violation conditions or alarm conditions, where it is necessary.

Figure 8:
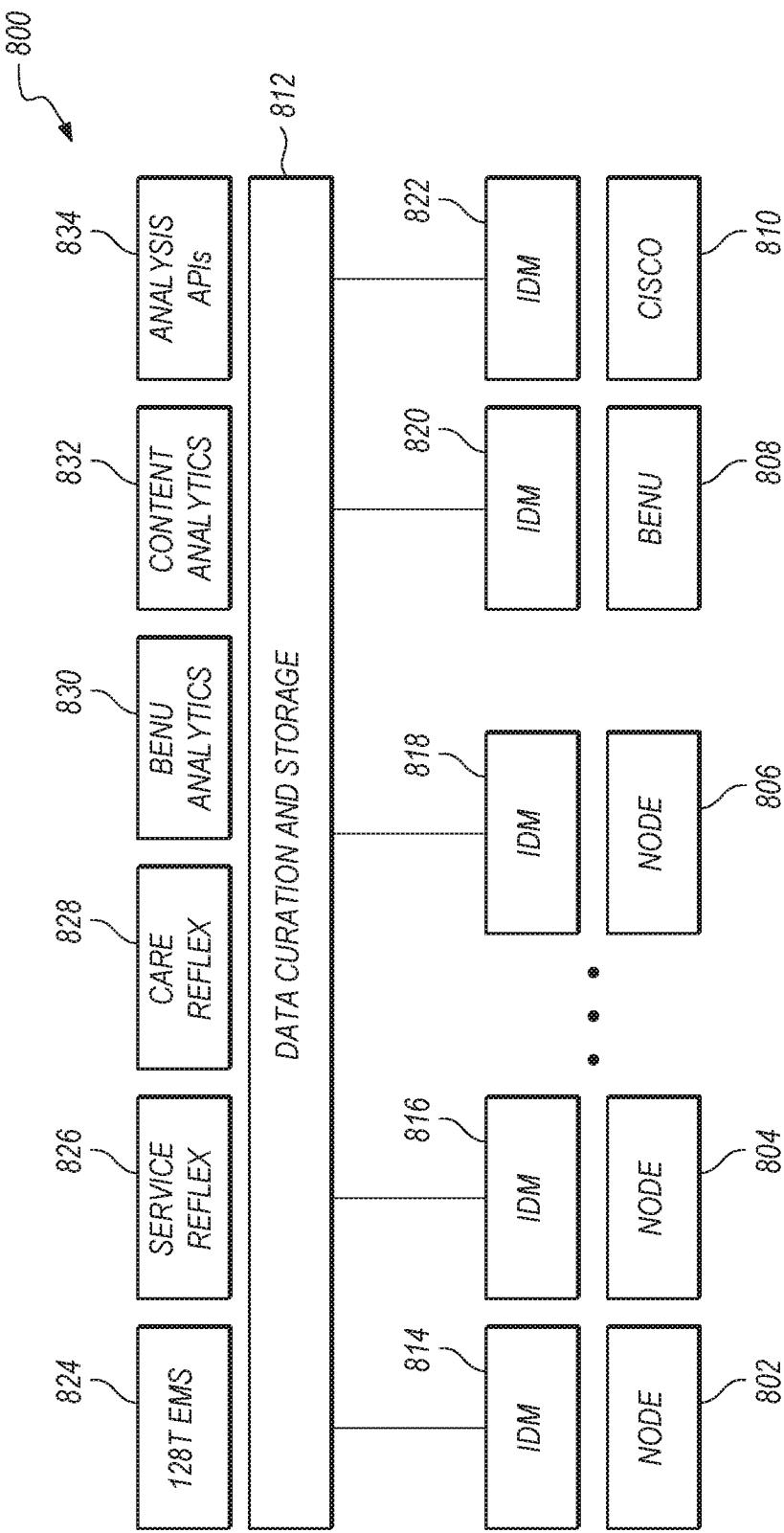
FIG. 8 shows an illustrative block diagram of an embodiment of a system for managing network operations as described herein and in accordance with an illustrative embodiment.

With reference to FIG. 8, there is shown an illustrative block diagram of an embodiment of a system 800 for managing network operations. The system 800 is substantially similar to the system 700, with the exception, as shown and described, that the network components and application components may differ from those described in relation to FIG. 7.

Figure 9:
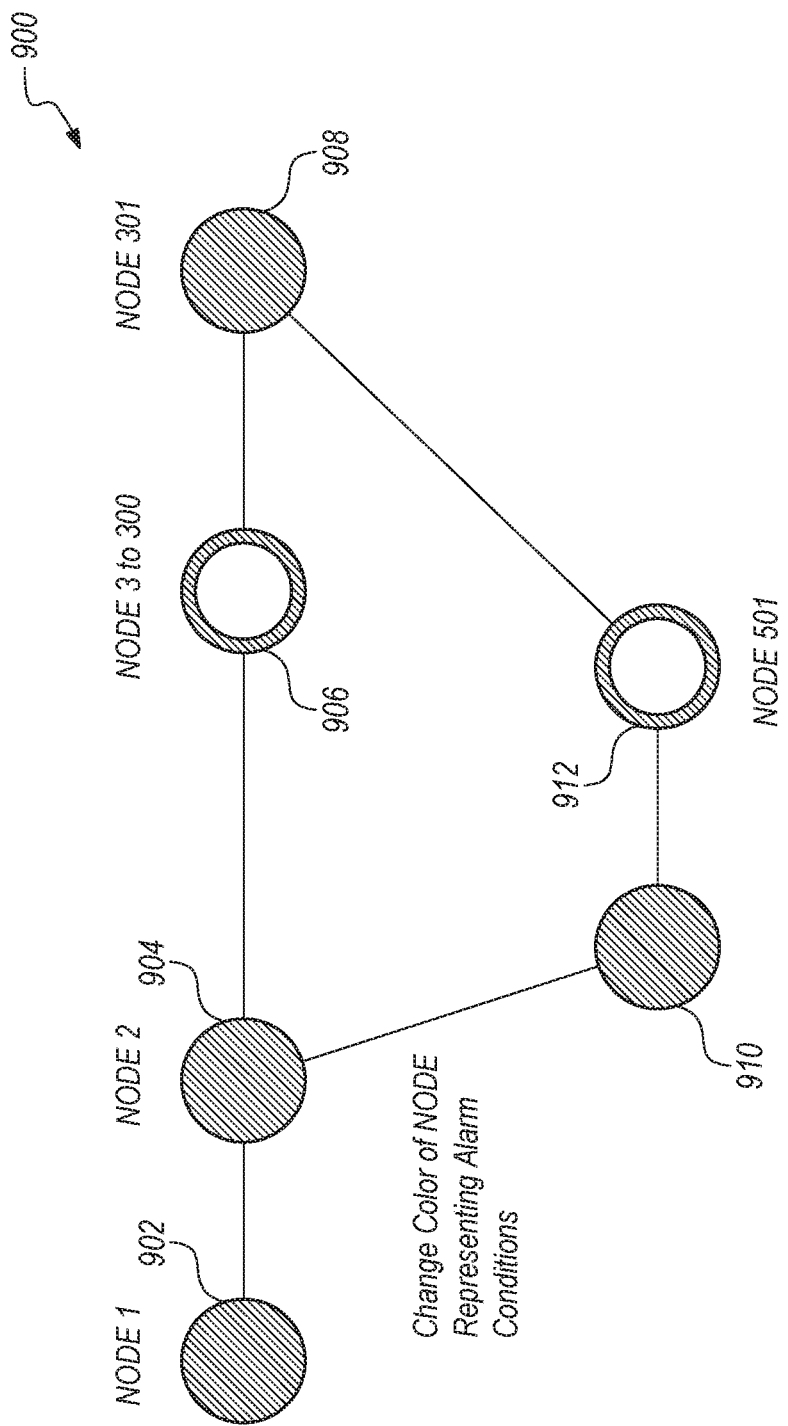
FIG. 9 shows an illustrative network status report displaying network alarm conditions in relation to network nodes as described herein and in accordance with various embodiments.

With reference to FIG. 9, there is shown network status report 900 displaying network alarm conditions in relation to a plurality of network components or nodes 902, 904, 906, 908, 910, and 912. In various embodiments, each of the nodes may be associated with a particular alarm condition indicator. The alarm condition indicator may indicate an alarm condition or status of the network node in relation to at least one network data component or data link associated with the node. An alarm condition indicator may, more particularly, indicate that a network component or data link associated with the node is within a threshold value of its associated baseline, or that the network component or data link has departed, by one or more threshold values, from its baseline.

Thus, the alarm condition indicator may include a plurality of alarm condition indicia. For instance, a green alarm condition indicator may indicate that no network data component or data link associated with the node has deviated beyond an associated baseline by greater than a threshold value. A yellow alarm condition indicator may indicate that at least one network data component or data link associated with the node has deviated from an associated baseline by at least a first threshold value, and a red alarm condition indicator may indicate that at least one network data component or data link associated with the node has deviated from an associated baseline by at least a second (greater) threshold value. For example, and to illustrate, the nodes 902, 904, and 910 may be associated with a first (green) alarm condition indicator, the nodes 906 and 912 may be associated with a second (yellow) alarm condition indicator, and the node 908 may be associated with a third (red) alarm condition indicator.

A user may therefore review the network status report 900, at a high level, to determine where, within the network monitored by the systems described herein, a network component is departing from normal, or baseline, operations. Such activity may indicate that the network is not operating, as a result of the anomalous network component, within an ideal or normal range and, as a result, that the network may experience some disruption, failure, latency, or the like.

Figure 10:
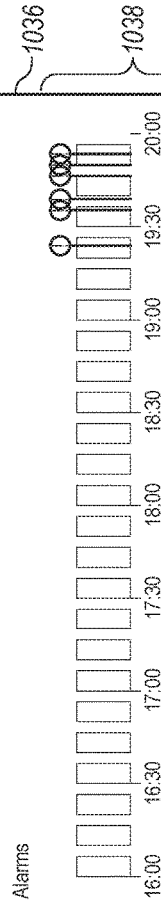
FIG. 10 shows an illustrative network report displaying a network alarm condition dashboard as described herein and in accordance with various embodiments.

With reference to FIG. 10, there is shown an illustrative network report displaying a network alarm condition dashboard 1000. The network alarm condition dashboard 1000 may include an alerts inbox 1002 and a reading pane 1004. The alerts inbox 1002 may list a plurality of sessions (as described above) associated with recently generated alert conditions. For example, as shown, the inbox 1002 may include sessions 1006, 1008, 1010, 1012, 1014, 1016, 1018, 1020, and 1022, each of which may be associated with a recently generated alarm condition.

Each session 1006-1022 may be associated with one or more alarm conditions. For example, the session 1006 may be associated with alarm conditions 1024, 1026, 1028, 1030, and 1032, all of which may have occurred during a particular time period. The user may select the session, such as session 1006, to review, in the inbox 1002, a list or sub-list of the alarm conditions associated with the selected session.

The reading pane 1004 may display a variety of detail in association with each of the sessions and alarm conditions. For example, as shown, the reading pane 1004 may be divided into two sub-panes, an alarm detail pane 1034 and a time series alarm pane 1036. The alert detail pane 1034 may display detail associated with a particular alarm condition, such as the alarm condition 1024. The time series alarm pane 1036 may display detail associated with a plurality of alarms. Each alarm may be displayed on a timeline 1038. A user may therefore receive, via the timeline 1038, a visual indication of the timing of a plurality of alarms.

Figure 11:
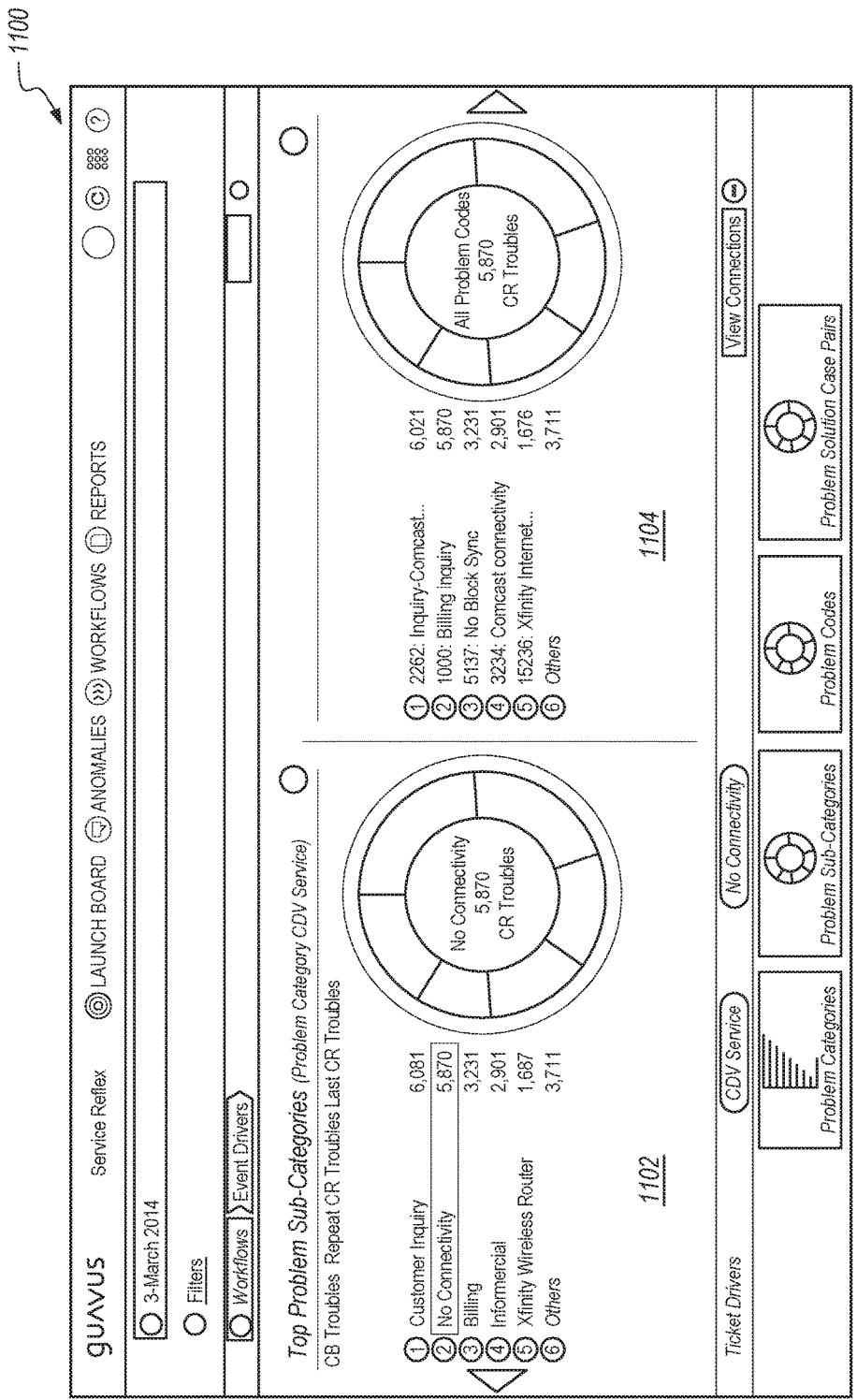
FIG. 11 shows an illustrative network report displaying network workflow conditions as described herein and in accordance with various embodiments.

With reference to FIG. 11, there is shown an illustrative network report 1100 displaying a plurality of network workflow conditions. The report 1100 may include various detail, including, as shown, a chart 1102 diagramming a plurality of problem categories and a chart 1104 diagramming a plurality of problem codes.

The systems and methods described herein may therefore enable network management operations based upon the analysis of a variety of network component, data link, and other relevant network data. As described herein, one or more mediation nodes may eliminate or reduce reliance on physical network probes for data collection. Moreover, the mediation nodes may generate baseline data for the plurality of network components and data links and may, based upon the baseline data, generate a plurality of network alarm conditions, and prioritize and consolidate those conditions, in support of various network management operations.

The descriptions of the systems described herein are not intended to limit the teachings or applicability of this disclosure. For example, the processing of the various components of the illustrated systems may be distributed across multiple machines, networks, and other computing resources. In addition, two or more component of a system may be combined into fewer components. While some examples of possible connections between systems are shown, any of the components shown herein may communicate with any other subset of component in various implementations.

Depending on the embodiment, any of the functions or actions may be performed in a different sequence, may be added, merged or left out altogether (e.g., not all described acts or events are necessary for the practice of the algorithms). Moreover, in certain embodiments, acts or events may be performed concurrently, e.g. though multi-threaded processing, interrupt processing, or multiple processors or processor cores or on other parallel architectures, rather than sequentially.

The various features and processes described may be used independently of one another, or may be combined in various ways. All possible combinations and sub-combinations are intended to fall within the scope of this disclosure. In addition, certain method or process blocks or steps may be omitted in some implementations. The methods described herein are also not limited to any particular sequence, and the blocks or steps relating thereof can be performed in other sequences that are appropriate. For example, described blocks or steeps may be performed in an order other than that specifically disclosed, or multiple blocks or steps may be combined in a single block or step. The example blocks or steps may be in serial, in parallel, or in some other manner. Blocks or steps may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might, "may," "e.g.," and the like, unless specifically stated otherwise, or otherwise understood with the context as used, is generally intended to convey that certain embodiments include, while other embodiments do not include, certain features, elements, and/or steps. Thus, such conditional language is not generally intended to imply that features, elements and/or steps are in any way required for one or more embodiment or that one or more embodiments necessary include logic for deciding, with or without author input or prompting, whether these features, elements, and/or steps are included or are be performed in any particular embodiment. The terms "comprising," "including," "having," and the like are synonymous and are used inclusively, in an open-ended fashion, and do not exclude additionally elements, features, acts, operations, and so forth. Also, the term "or" is used in its inclusive (and not in its exclusive sense) so that when used for example, to connect a list of elements, the term "or" means one, some or all of the elements of the list.

While certain embodiments have been described, these embodiments have been presented by way of example only, and are not intended to limit the scope of the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omission, substitutions and changes in the form of the methods and systems described herein may be made without departing from the spirit of the disclosures herein.

It is to be understood that the detailed description of illustrative embodiments is provided for illustrative purposes. Thus, the degree of software modularity for the system and method presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for managing network operations, the system comprising:
   a plurality of network components, in which each network component generates a plurality of network component data, the plurality of network component data including an available bandwidth subset,
   a server including a processor, memory, and a mediation node that further includes at least one baseline module, in which the mediation node also receives the plurality of network component data and associates a plurality of time series data and a network topology with the network component data;
   a plurality of subsets of network component data selected by the mediation node;
   the at least one baseline module receives the plurality of subsets of network component data, wherein the baseline module generates a plurality of baselines for anomaly detection, wherein each of the plurality of baselines correspond to one of the plurality of received subsets;
   the mediation node configured to fuse at least two subset baselines into a combined baseline;
   at least one application component communicatively coupled to the mediation node, wherein the application component receives the time series data, the plurality of subsets of the network component data, and a plurality of baselines, wherein the plurality of baselines include the subset baselines and the combined baseline; and
   wherein the application component identifies a relationship between the time series data, the plurality of subsets of network component data and the plurality of baselines.

2. The system of claim 1 wherein the plurality of subsets of network component data are selected according to at least one performance indicator.

3. The system of claim 2 further comprising a condition associated with the performance indicator, wherein triggering the condition indicates a violation without triggering an alarm.

4. The system of claim 3 further comprising a plurality of alarms that are prioritized according to the performance indicator that includes at least one of a service value, a financial value, a severity, a revenue impact and a subscriber impact.

5. The system of claim 4 further comprising a packet capture component that transmits a control message to an intelligent tap, which transmits a plurality of packets to a packet analysis application.

6. A system of claim 1 wherein the server is located at a different geographic location than at least one of the network components.

7. The system of claim 1 wherein the plurality of network component data is generated from at least one of a data warehouse, a billing system, a data lake, an element management system, a ticketing system, an interactive voice response system, a call detail record, and a warranty tracking system.

8. The system of claim 1 wherein the plurality of network components include,
   a subscriber identity that is associated with a wireless device, and
   a processor associated with the wireless device.

9. The system of claim 8 wherein the plurality of subsets of network component data are selected according to the performance indicator that includes at least one of a service value, a business impact, a network related event, and a community of subscribers.

10. The system of claim 1 wherein the application component identifies a change in a network configuration that may impact a service.

11. The system of claim 1 further comprising a plurality of alarms that are prioritized according to a performance indicator that includes at least one of a service value, a financial value, a severity, a revenue impact and a subscriber impact.

12. The system of claim 1 further comprising a plurality of alarms that are reduced to a single alarm when a relationship exists between the alarms and the alarms occur at a same time frame.

13. The system of claim 1 further comprising,
   a plurality of local servers, wherein each local server includes a local processor, local memory, and a local mediation node, in which each local mediation node receives the corresponding plurality of network component data and associates a plurality of time series data and a network topology with the network component data;
   a central server, wherein the central server includes a central processor, central memory, and a central mediation node communicatively coupled to the plurality of local mediation nodes; and
   the application component communicatively coupled to the central mediation node, wherein the application component receives the time series data, the plurality of subsets of the network component data, and the plurality of baselines.

14. The system of claim 13 wherein each of the plurality of local servers is located at a different geographic location than the central server.

15. A system for managing network operations, the system comprising:

a plurality of network components, in which each network component generates a plurality of network component data, the plurality of network component data including an available bandwidth subset;

a plurality of local servers, wherein each of the plurality of local servers includes a processor, a memory, and a mediation node that further includes at least one local baseline module, in which each local mediation node receives the corresponding plurality of network component data and associates a plurality of time series data and a network topology with the network component data;

a central server including a central processor, a central memory, and a central mediation node that further includes at least one central baseline module, wherein the central mediation node is communicatively coupled to the plurality of local mediation nodes;

at least one subset of the plurality of network component data selected by at least one of the central mediation node and the plurality of local mediation nodes;

at least one of the at least one local baseline module and the at least one central baseline module receives the subset of the network component data, wherein the baseline module generates at least one baseline for anomaly detection;

at least one of the plurality of local mediation nodes and the central mediation node configured to fuse at least two subset baselines into a combined baseline;

at least one application component communicatively coupled to the central mediation node, wherein the application component receives the time series data, the plurality of subsets of the network component data, and a plurality of baselines, the plurality of baseline including the subset baselines; and wherein the application component identifies a relationship between the time series data, the plurality of subsets of the network component data and the plurality of baselines.

16. The system of claim 15 wherein the at least one subset of the plurality of network component data is selected according to at least one performance indicator.

17. The system of claim 16 further comprising a condition associated with the performance indicator, wherein triggering the condition indicates a violation without triggering an alarm.

18. The system of claim 17 further comprising a plurality of alarms that are prioritized according to the performance indicator that includes at least one of a service value, a financial value, a severity, a revenue impact and a subscriber impact.

19. The system of claim 18 further comprising a packet capture component that transmits a control message to an intelligent tap, which transmits a plurality of packets to a packet analysis application.

20. A method for managing network operations for a plurality of network components, the method comprising, receiving, by a mediation node residing on a server having a processor and memory, a plurality of network component data for each of the plurality of network components, the plurality of network component data including an available bandwidth subset, wherein the mediation node associates a plurality of time series data and a network topology with the network component data;

selecting, by the mediation node, at least one subset of network component data;

generating at least two baselines for anomaly detection from the subsets of the network component data with at least one baseline module residing within the mediation node;

fusing, by the mediation node, at least two subset baselines into a combined baseline;

enabling at least one application component to be communicatively coupled to the mediation node, wherein the application component receives the time series data, the plurality of subsets of the network component data and a plurality of baselines, the plurality of baselines including the subset baselines; and identifying a relationship between the time series data, the plurality of subsets of the network component data and the plurality of baselines, wherein the application component identifies the relationship.

21. The method of claim 20 wherein the network component data and the subset of network component data is selected according to at least one performance indicator.

22. The method of claim 21 further comprising associating a condition with the performance indicator, wherein triggering the condition indicates a violation without triggering an alarm.

23. The method of claim 22 further comprising prioritizing a plurality of alarms according to the performance indicator that includes at least one of a service value, a financial value, a severity, a revenue impact and a subscriber impact.

24. The method of claim 23 further comprising enabling a packet component to transmit a control message to an intelligent tap, which transmits a plurality of packets to a packet analysis application.

25. A method for managing network operations for a plurality of network components, the method comprising:

receiving, by a local mediation node residing on a local server, a plurality of network component data for each of the plurality of network components, the plurality of network component data including an available bandwidth subset, wherein the local mediation node associates a plurality of time series data and a network topology with the network component data;

communicatively coupling a plurality of local mediation nodes to a central mediation node, wherein each of the plurality of local mediation nodes resides on a local server and the central mediation node resides on a central server;

selecting at least one subset of the plurality of network component data, wherein the selection of the subset of the plurality of the network component data is performed by at least one of the local mediation node and the central mediation node;

generating at least two baselines for anomaly detection from the subsets of the network component data with at least one baseline module, wherein each of the central mediation node and the plurality of local mediation nodes include a baseline module;

fusing at least two baselines into a combined baseline, wherein the fusion is performed by one of the central mediation node and the plurality of local mediation nodes;

enabling at least one application component to be communicatively coupled to the central mediation node, wherein the application component receives the time series data, the plurality of subsets of the network component data and a plurality of baselines, the plurality of baseline including the subset baselines; and identifying a relationship between the time series data, the plurality of subsets of the network component data and the plurality of baselines, wherein the application component identifies the relationship.

26. The method of claim 25 wherein the at least one subset of plurality of network component data is selected according to at least one performance indicator.

27. The method of claim 26 further comprising associating a condition with the performance indicator, wherein triggering the condition indicates a violation without triggering an alarm.

28. A system for managing network operations, the system comprising:
- a plurality of network components, in which each network component generates a plurality of network component data, the plurality of network component data including a processor temperature subset;
- a server including a processor, memory, and a mediation node that further includes at least one baseline module, in which the mediation node also receives the plurality of network component data and associates a plurality of time series data and a network topology with the network component data;
- a plurality of subsets of network component data selected by the mediation node;
- the at least one baseline module receives the plurality of subsets of network component data, wherein the baseline module generates a plurality of baselines for anomaly detection, wherein each of the plurality of baselines correspond to one of the plurality of received subsets;
- the mediation node configured to fuse at least two subset baselines into a combined baseline;
- at least one application component communicatively coupled to the mediation node, wherein the application component receives the time series data, the plurality of subsets of the network component data, and a plurality of baselines, wherein the plurality of baselines include the subset baselines and the combined baseline; and
- wherein the application component identifies a relationship between the time series data, the plurality of subsets of network component data and the plurality of baselines.

* * * * *